United States Patent [19]

Kochsmeier et al.

[11] Patent Number: 5,097,526

[45] Date of Patent: Mar. 17, 1992

[54] CONNECTOR FOR TWO OPTICAL CABLES

[75] Inventors: Gunter Kochsmeier; Zbigniew Wiegolaski, both of Stadthagen, Fed. Rep. of Germany

[73] Assignee: Alcatel N.V., Netherlands

[21] Appl. No.: 623,291

[22] Filed: Dec. 6, 1990

[30] Foreign Application Priority Data

Dec. 7, 1989 [DE] Fed. Rep. of Germany ....... 3940414

[51] Int. Cl.⁵ .............................................. G02B 6/38
[52] U.S. Cl. ...................................... 385/99; 385/113
[58] Field of Search ................ 350/96.21, 96.23, 96.22

[56] References Cited

U.S. PATENT DOCUMENTS

| | | | |
|---|---|---|---|
| 4,595,256 | 6/1986 | Guazzo | 350/96.21 |
| 4,875,757 | 10/1989 | Greveling | 350/96.23 |
| 4,948,222 | 8/1990 | Corke et al. | 350/96.21 |

Primary Examiner—William L. Sikes
Assistant Examiner—Robert E. Wise
Attorney, Agent, or Firm—Peter C. Van Der Sluys

[57] ABSTRACT

In a tension-proof connection for optical waveguide cables, a metal sleeve (4) containing several longitudinal slots (8) separated from each other is slid over the stripped length of the cable ends. Reinforcing fibers (3) are led out through the longitudinal slots (8) and are present on the metal sleeve (4) in a stretched condition. A shrinkage hose (7) shrunk onto the metal sleeve (4) fixes the reinforcing fibers (3) on the sleeve surface (4). Over the course of their stripped length, the optical waveguide cores (2) are conducted helically in slots of spacers (6) located on a central element (1).

3 Claims, 1 Drawing Sheet

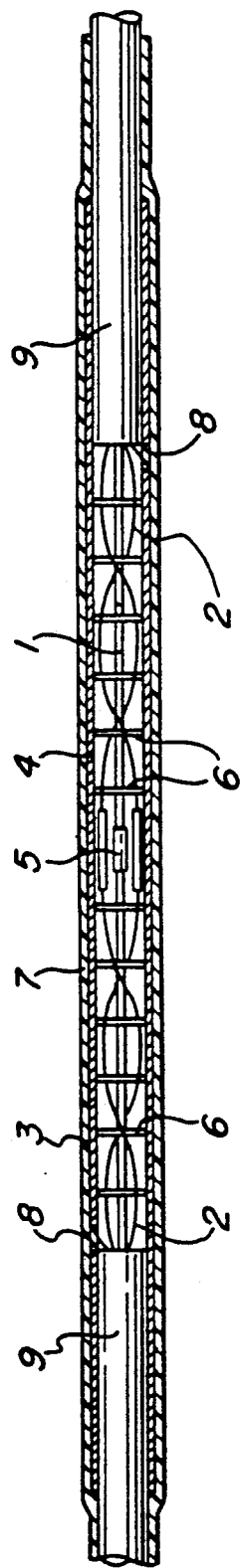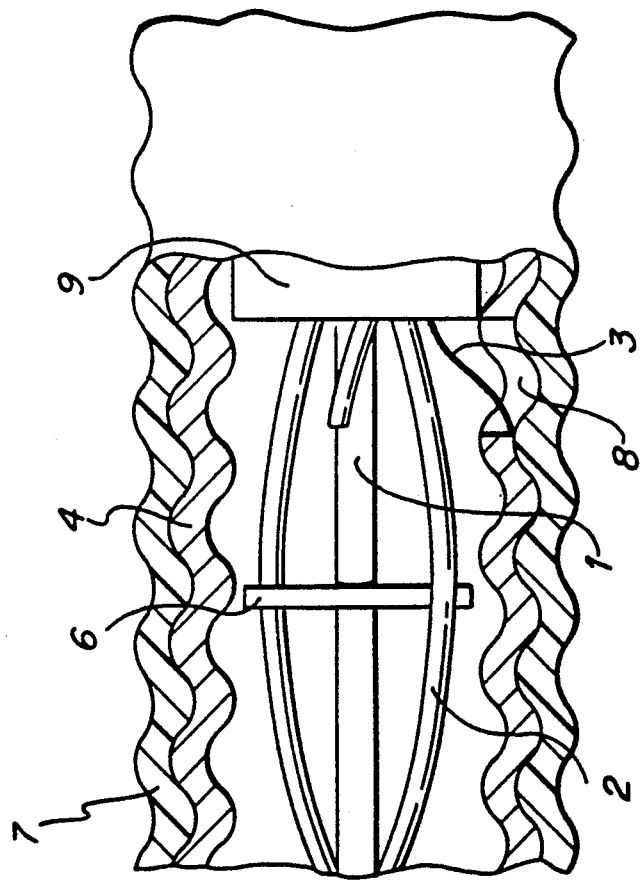

CONNECTOR FOR TWO OPTICAL CABLES

The invention relates to a tension-proof connection optical waveguide cables which consist of a central element, preferably of glass-fiber reinforced plastic, cored glass fibers located around the central element, a layer of high-strength fibers, preferably aramid yarn, placed on the core formed in this manner, and an outer sheath designed as a so-called layer sheath A cable in which two types of cable are integrated, namely an energy cable and a communication cable, has become known. In this, an optical waveguide cable is located in a filler of the stranding web consisting of the three power wires. Cables of this type for underground laying are relatively short, i.e., their length is restricted to the capacity of a cable drum.

For ocean cables, for which the manufacturing costs and installation costs are very high, the advantages of the combined energy-communication cable are significantly greater, because the individual lengths are no longer restricted by the capacity of the cable drum. Ocean cables of this type are transported by ships, in windings of great length, and are installed directly from the ship. In this way, it is possible to lay up to 30 km of cable in one length. However, such lengths require a number of splice joints.

As a rule, ocean cables contain a reinforcement of steel wires, in order to be able to absorb the tensile forces during installation and to prevent damage by ship anchors. The cable must be resistant to sea water and must withstand the pressure at depths of up to 100 meters. Since cables of this type must be brought in for repair purposes, the cable must be capable of transmitting the tensile forces required for this purpose. Since the cable is unreeled from so-called coils, the cable is twisted once about its own axis during the take-up of each turn. All of these forces and attacks also act on the optical waveguide cable which, in addition, must also absorb all of the forces occurring during stranding. Very high mechanical and physical demands are therefore made on the optical waveguide cable which, of course, also apply to the connection points.

The present invention is based on the task of indicating a tension-proof connection for the optical waveguide cable mentioned at the beginning, which can absorb high mechanical tensile forces and does not lead to any significant increase in diameter in the connection region. In addition, the connecting point should be flexible In particular, the connection point is to be used for the ocean cable described above, but is not to be restricted to this.

The problem is solved by a combination of the following characteristics:

a. The outer sheaths are stripped over a specific length with respect to the optical waveguides to be connected or the central elements and the layers of high-strength fibers.

b. Radially slotted plastic discs, whose diameter is identical to or smaller than the outside diameter of the outer sheath, are placed, at intervals from each other, on the central elements, which are connected with each other in a force-locked manner.

c. The glass fibers are inserted helically into the slots of the plastic discs and are connected to each other at their ends.

d. The stripped length is covered by a metal pipe placed on the ends of the outer sheaths, said pipe containing at least two longitudinal slots spaced with respect to each other.

e. The ends of the high-strength fibers are conducted to the outside through the longitudinal slots and are fixed in a stretched state on the metal pipes.

f. The connection is covered by a shrinkage hose placed on the outer sheaths of the cables that are connected to each other.

The plastic discs serve as spacers and ensure a uniform distance between the glass fibers and the central element. The helical course of the glass fibers ensures an adequate excessive length of the glass fibers in the area of the connection, so that, in the case of bending of the connecting point, an overextension or a tearing of the glass fibers is prevented. The metal pipe serves for the mechanical protection of the glass fibers in the stripped region and as a supporting element for the tension-proof fibers in connection with the shrinkage process of the shrinkage hose. The fibers are led out through the longitudinal slots and are held in place by the shrinkage hose on the pipe surface. In addition, the shrinkage hose is intended to seal the connecting point, and, for this purpose, advantageously has an inner coating of a hot-melt adhesive.

According to a particularly preferred further development of the invention, two rows of at least three longitudinal slots are present, and the longitudinal slots are located in the area of the stripped layers. This measure facilitates the passage of the high-strength fibers through the longitudinal slots and leads to a relatively large length of the fibers deposited on the pipe surface and, thus, to a good mechanical connection. Since the metal pipe may be exposed to flexions during stranding, during winding on the drum, during installation, etc., it has been found advantageous for the metal pipe to show a helical or annular corrugation. For one thing, the corrugation reduces the bending resistance of the metal pipe, i.e., it increases its flexibility and, at the same time, increases the compressive strength. A further advantage of the corrugation is to be seen in the fact that, as a result of the corrugation, better forcelocking of the fibers on the pipe surface can be obtained.

The invention is explained in greater detail by means of the exemplifying embodiments represented schematically in FIGS. 1 and 2.

FIG. 1 shows a section through a tension-proof connection for optical waveguide cables consisting of a central element 1 of glass-fiber reinforced plastic, cored glass fibers 2, a layer 3 of fibers with high tensile strength based on aramid, and an outer sheath 9 designed as a layer sheath. To produce the connection, the ends of the cables to be connected are first stripped i.e., the outer sheath 9 is removed over a certain length and the high-strength fibers are exposed. A shrinkage hose 7 and a metal pipe 4 are slid over one of the ends. Various plastic discs 6 are placed on the exposed ends of the central elements 1 and are exposed, e.g., by adhesion. The mechanical connection between the ends of the central elements 1 is produced as shown at 5. The glass fibers 2 are optically bonded to each other and are inserted helically into the slots of the discs 6. The metal pipe 4 is slid over the stripped connecting point, so that it is present on both cables, e.g., on the outer sheath 9. The metal pipe 4 contains two rows of three longitudinal holes 8, arranged uniformly over its circumference, of which only one hole is shown in each case. The fibers of the layer 3 are led out through these longitudinal holes 8 and are arranged in a stretched state distributed over the surface of the metal pipe 4, where they are fastened in a pointwise manner, for example, with self-sealing, very thin insulating tape. The shrinkage hose 7 is slid over the metal pipe 4 and is shrunk onto the pipe 4 and the outer sheaths 9 of the cables. On its inner surface, the shrinkage hose 7 shows a layer of hot-melt adhesive, known in itself and not identified further, by means of which the fibers of the layer 3 are fastened on the surface of the metal pipe 4. In this way, a mechanical connection between the layers 3 of the cables connected to each other is established.

The connection is capable of transmitting the required tensile forces of the cables. The transverse rigidity is increased further by the plastic discs 6.

FIG. 2 shows an enlarged section of a part of the connection, in which the metal pipe 4 is designed as a corrugated metal pipe. The transverse rigidity of the metal pipe is increased by the corrugation. In addition, the mechanical connection between the metal pipe 4 and the fibers of the layer 3 is improved by an improved form-locking.

In addition to the ability to transmit high tensile forces, the connection according to the invention is also distinguished by the fact that no significant increase in diameter occurs in the area of the connecting point. These advantageous properties make it possible to strand optical waveguide cables of the above-mentioned type together with power wires. The corrugated metal pipe 4 is so flexible that it can be shaped along the course of the length of twist. The forces acting in a radial direction during stranding and the subsequent reinforcement are absorbed without thereby impairing the watertightness.

We claim:

1. Tension-proof connection between two optical waveguide cables of the type including a central element, cored glass fibers located around the central element, a layer of high-strength fibers placed on the glass fibers, and an outer sheath, characterized by the following characteristics:
   a. the outer sheaths are stripped over a specific length with respect to the glass fibers to be connected (2), the central elements (1) and the layers of high-strength fibers;
   b. radially slotted discs (6), whose diameter is no larger than an outside diameter of the outer sheath, are placed in a spaced-apart manner on the central elements (1) which are connected to each other;
   c. the glass fibers (2) are inserted helically into the slots of the discs (6) and are connected with each other at their ends;
   d. the stripped length is covered by a metal pipe (4) extending over the ends of the outer sheaths, said metal pipe containing at least two longitudinal slots (8) separated from each other;
   e. the ends of the high-strength fibers (3) are conducted to the outside through the longitudinal slots (8) and are placed in a stretched state on the metal pipe (4); and
   f. the connection is covered by a strinkage hose (7) extending over the metal pipe and a portion of the outer sheaths of the cables connected to each other.

2. Tension-proof connection according to claim 1, characterized by the fact that two rows of at least three longitudinal slots (8) are present, and the longitudinal slots (8) are located in the area of the stripped layers.

3. Tension-proof connection according to claim 1 characterized by the fact that the metal pipe (4) shows a helical or annular corrugation.

* * * * *